United States Patent [19]

Elsbett et al.

[11] Patent Number: 5,065,707
[45] Date of Patent: Nov. 19, 1991

[54] OIL-COOLED CYLINDER HEAD

[76] Inventors: Ludwig Elsbett; Günter Elsbett; Klaus Elsbett, all of Industriestrasse 14, D-8543 Hilpoltstein, Fed. Rep. of Germany

[21] Appl. No.: 477,957
[22] PCT Filed: Nov. 25, 1988
[86] PCT No.: PCT/DE88/00731
§ 371 Date: May 24, 1990
§ 102(e) Date: May 24, 1990
[87] PCT Pub. No.: WO89/04916
PCT Pub. Date: Jun. 1, 1989

[30] Foreign Application Priority Data

Nov. 25, 1987 [DE] Fed. Rep. of Germany ....... 3739899

[51] Int. Cl.[5] ................................................ F01P 3/00
[52] U.S. Cl. ........................... 123/41.42; 123/41.82 R; 123/193 CH
[58] Field of Search .......... 123/41.42, 41.74, 41.82 R, 123/41.84, 193 CH, 306

[56] References Cited

U.S. PATENT DOCUMENTS 4,573,436  3/1986  Owens .............................. 123/41.18
4,854,276  8/1989  Elsbett et al. ..................... 123/41.42

FOREIGN PATENT DOCUMENTS 2729050  1/1979  Fed. Rep. of Germany.
3314543  10/1984  Fed. Rep. of Germany ... 123/41.42

Primary Examiner—Noah P. Kamen
Attorney, Agent, or Firm—Peter K. Kontler

[57] ABSTRACT

A four-stroke internal combustion engine is designed so that combustion takes place in a central zone surrounded by an insulating layer of excess air. The air layer inhibits heat transfer thereby making it unnecessary to externally cool the portion of the cylinder below the area of the piston rings. A cylinder head for the engine has an annular cooling channel which is arranged to cool the portion of the cylinder above the uppermost piston ring. Since only a limited portion of the cylinder needs to be cooled via the cooling channel, the cooling requirements can be met by circulating oil through the channel. By appropriate control of the combustion process, a water-cooled or air-cooled engine can be converted to oil cooling using the cylinder head. When the cylinder head is used to convert a water-cooled engine, the cylinder head is designed to seal the water channels.

10 Claims, 3 Drawing Sheets

OIL-COOLED CYLINDER HEAD

BACKGROUND OF THE INVENTION

The invention relates to an oil-cooled cylinder head for a four-stroke internal combustion engine in which combustion occurs with little heat loss. Combustion takes place in a hot core and this core is surrounded by an insulating layer of excess air. Accordingly, the cylinder wall requires no external cooling, at least not below the area of the piston which serves as the ring carrier.

The subject of the present application is thus an improvement for the cooling system of a four-stroke internal combustion engine, especially the cylinder head. Among other things, the improvement brings about savings in fuel by reducing cooling requirements, decreases frictional losses between the piston and the cylinder wall, and eliminates thermal stresses.

The subject of the present invention is also a conversion kit for modifying water-cooled or air-cooled internal combustion engines on the market so that the improved thermal characteristics of an oil-cooled engine can be imparted to the same.

Improvements in the thermal characteristics of an engine cannot be achieved by cooling the parts adjacent to the combustion chamber as intensively as possible. Nevertheless, this has been the conception for the past several decades. This is indicated by the use of water as the usual cooling medium in practice. Due to its high heat capacity, water constitutes a reliable agent for the optimal removal of heat from the engine. However, this reliability is associated with the drawback that a separate cooling circuit, including flow channels in the cylinder head and motor block, must be provided. Thus, although water is not to contact functional parts of the engine and is inherently foreign to engine operation, it has been employed because of its cooling efficiency. As a result, instead of designing the engine for optimum operation, the overall thermal characteristics of the engine were based on the properties of water as a cooling agent; the effect on the development of engine components was, for example, that strongly heat-conducting materials such as aluminum were used for pistons, cylinders and even cylinder heads so that the intense cooling action of the water could penetrate to the interior of the engine.

Thermal cracks in the material are only one phenomenon which demonstrate the contrast between engine operation with hot gases and abrupt cooling of the material to the temperature of the cooling water. A contributing factor here is that the possibility of rapid heat removal leads to combustion processes whose performance is based on heat removal through the walls of the combustion chamber, that is, all thermally uniform combustion processes in which the entire quantity of air is mixed with the fuel and the walls of the combustion chamber are subjected to a flame upon combustion. This includes chamber processes which are associated with significant heating of the combustion chamber walls.

To the present, the drawback of this cooling concept is that up to a third of the energy supplied is lost to the cooling water and, from there, must be transferred to the atmosphere via heat exchangers. It is no different in engines with external air cooling where numerous cooling ribs are provided in an attempt to make the engines as effective as a water-cooled engine with respect to heat removal. Experiments with oil cooling, which are carried out now and then, also function in accordance with this principle: it is attempted to compensate for the lower heat capacity of oil compared to water by increasing the flow quantity and the sizes of the oil cooling chambers with reference to water-cooled engines. From the point of view of rapid heat removal, oil cooling cannot compete with water. Since the oil pumping devices must be enlarged, the operating efficiency of the engine is reduced.

It would also be incorrect to incorporate ceramic parts in a combustion chamber as a result of a development which had heat removal as its Primary Seal. Although the intent is to provide heat insulation since, the walls of the combustion chamber are heated during thermally uniform combustion processes, these walls become the starting point for combustion so that the last natural insulating layer, namely, the boundary air layer between ceramic part and combustion chamber, is destroyed. When this last air insulator between hot gases and wall is eliminated, heat transfer at the material increases abruptly instead of decreasing as originally contemplated.

In all of these cooling concepts, the fundamental reason for the concern with the thermal characteristics of engines has been neglected. This is that the heat of combustion of the fuel is to be used for heating of the working air, so that the latter expands and moves the pistons, and not for heating of the engine, other components or water.

Only the periodic increases in energy costs and subsequent attention to inexpensive fossil fuels brought about a recollection of the actual purpose of heating the air in the cylinders. This led to the objective of foregoing the concept of external cooling, whether with water or ambient air, in favor of achieving higher efficiencies. When vegetable oils, which impose much stricter requirements on the thermal characteristics of engines, began to be used as fuels, it became even more necessary to accelerate such a development.

It was not sufficient, however, to merely modify the incorrect conception of intensive heat removal which, instead, had to be rethought entirely; the present text also contributes to this rethinking. Thus, if heat removal from inside to outside is to be prevented, a whole series of measures must be considered for the region extending from the center of heating, namely, the combustion zone, through the pistons and to the cylinders.

The first step was the creation of a duothermal combustion process in contrast to the thermally uniform process which is still customarily used today in the reciprocating internal combustion engine, chamber engine and D.I. diesel engine. Thus, a layer of air is maintained between the central combustion zone and the wall of the combustion chamber. This layer does not participate in the combustion and, due to its insulating properties, allows only small quantities of heat to pass to the walls of the combustion chamber (West German Offenlegungsschrift No. 22 41 355 and the corresponding U.S. Pat. No. 4,015,577). If only small quantities of heat are transmitted to the walls of the combustion chamber, especially the pistons, there is no longer any need to make these of aluminum. It is possible to once again make the pistons of an iron alloy. An iron alloy, in turn, exhibits lower conductivity for heat still arriving at the pistons. These actions are accompanied by a third which resides in that the heat transfer areas between piston and cylinder are minimized; the ring carrier is separated from the skirt of the piston and, in the remaining upper portion of the piston, the heat transfer areas between the ring carrier and the bottom of the piston are further reduced (e.g., West German Offenlegungsschrift No. 32 10 771 and the corresponding U.S. Pat. No. 4,593,660). By virtue of the heat insulating measures described, this state of the art resulted in a minimization of the overall cooling requirements for engines and cooling was carried out, without any problems related to the low heat capacity of oil, using oil as a cooling agent (West German Offenlegungsschrift No. 33 14 543 and the corresponding U.S. Pat. No. 4,895,111). Spray cooling of the cylinder walls and piston with oil from below plays an important role here.

One of the questions which arises with the given state of development of oil-cooled engines is whether it would not also be possible, either retroactively or by engine interchange, to convert current water-cooled or air-cooled four-stroke internal combustion machines available on the market to the new oil cooling. Since the new oil cooling offers advantages with respect to fuel consumption and the use of alternative fuels such as, for example, vegetable oils, such a conversion can be worthwhile.

SUMMARY OF THE INVENTION

It is accordingly the object of the invention to provide a thermodynamically optimized engine which allows conventional engine blocks, and particularly the customary screw configuration of water-cooled and air-cooled engines, to be maintained while the structural measures for cooling are held to a minimum.

This object is achieved in that the cylinder head covers at least the zone of the cylinder in the region above the upper piston sealing ring. An annular oil channel for cooling of this region is formed in the cylinder head only or, alternatively, the sealing surface of the cylinder head facing the cylinder wall or the engine housing contains an annular groove which, together with the sealing surface of the cylinder wall or the engine housing, defines an annular oil channel serving to cool this region.

BRIEF DESCRIPTION OF THE DRAWINGS

FIGS. 1 and 2 illustrate cylinder head conversion kits for turbocharged engines and suction engines, respectively, while

DESCRIPTION OF THE PREFERRED EMBODIMENT

In turbocharged engines, the cylinder should project into the cylinder head. For suction engines, adequate cooling is achieved when the new head is placed in the old dividing plane between cylinder head and cylinder. The head in turbocharged engines, is cooled at the sealing location with the cylinder up to the level of a sealing collar which is located at the height of the first sealing ring.

If extension of the piston is to be avoided, the sealing collar of the head can also be sunk into the housing.

Figure 1:
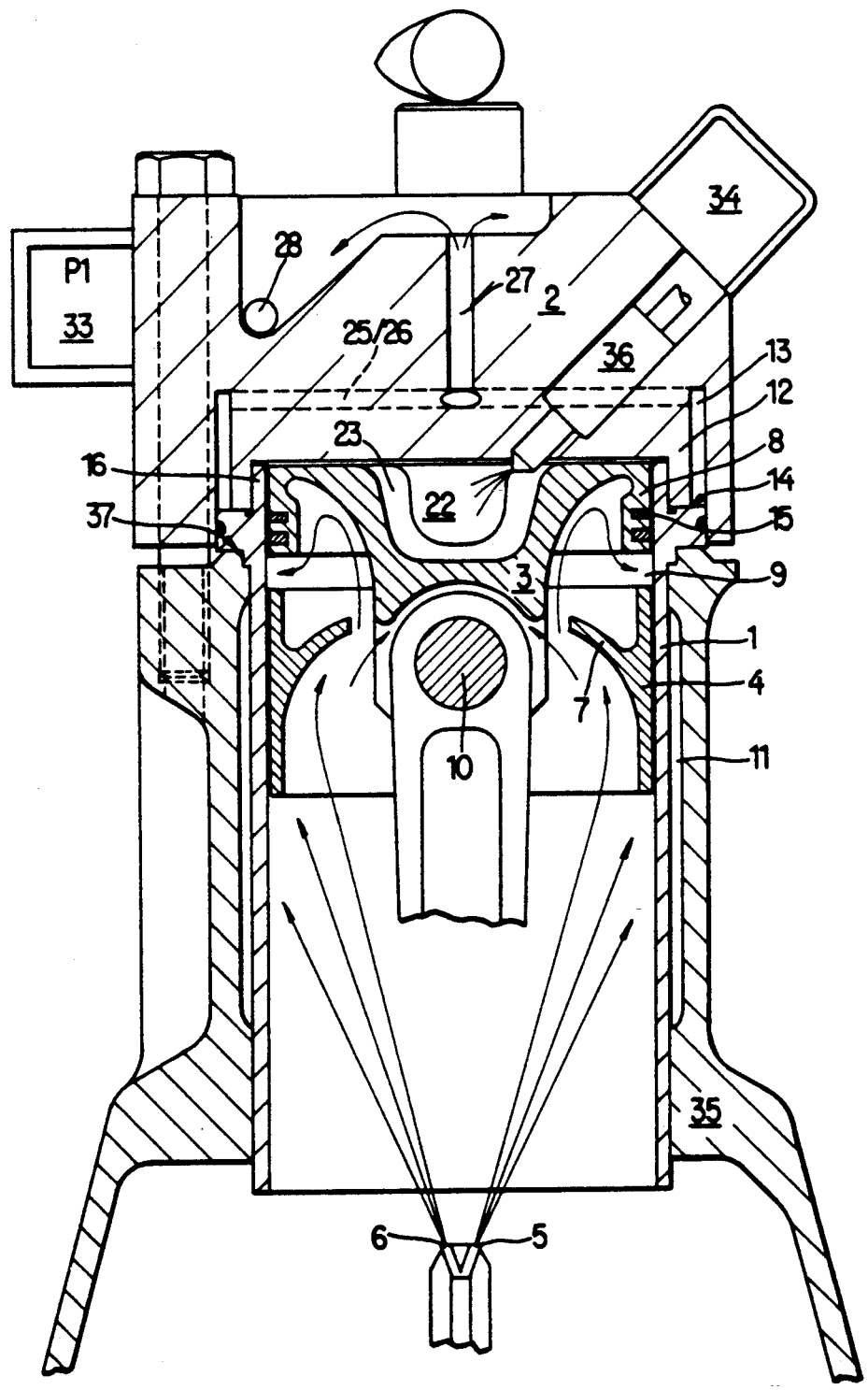

In FIG. 1, the cylinder is indicated at 1, the cylinder head at 2, the upper portion of the piston at 3, the skirt at 4 and the oil-spraying nozzles for internal oil cooling of the cylinder at 5 and 6. The upper portion of the cylinder is to be understood as the end of the cylinder which is exposed to the combustion gases.

Upon conversion, the cylinder sleeve 1 is here extended into the head. Internal cooling of the cylinder 1 takes place directly by means of the sprayed oil and also indirectly via the skirt 4 whose guide ribs 7 are impacted by and distribute the sprayed oil. Distribution of the cooling oil over the piston pin 10, the upper portion 3 of the piston with the sealing jacket 8, and the free space 9 between the skirt 4 and the upper portion 3 of the piston is regulated by the guide ribs 7. One guide rib suffices for this function if the guide rib is appropriately designed.

Since the cylinder is to have a uniform temperature over its entire length, an external cooling jacket would interfere. Therefore, if filled with oil, the only function of the intermediate compartment 11 between the cylinder 1 and the housing 35 would be as a muffler, i.e., in the event that the intermediate compartment 11 is filled with liquid, the latter should not be continuously replaced or circulated in accordance with the invention.

To obtain a uniform temperature for the cylinder 1, the heat flux from the cylinder head 2 to the cylinder 1 is interrupted. In the case of turbocharged engines, this is achieved by applying a thin sealing flange 12 to the cylinder head 2. The sealing flange 12 is cooled in such a manner by an oil jacket/annular channel 13 that it assumes the temperature of the cylinder 1.

The length of this sealing flange 12 is such that the sealing location 14 reaches the temperature of the cylinder 1. This temperature is always reached at, and in most cases above, the plane of the first piston ring 15. To reduce heating of the sealing flange 12 to a minimum, a collar 16 which shields the sealing flange 12 from the combustion gases is affixed to the cylinder 1.

Figure 2:
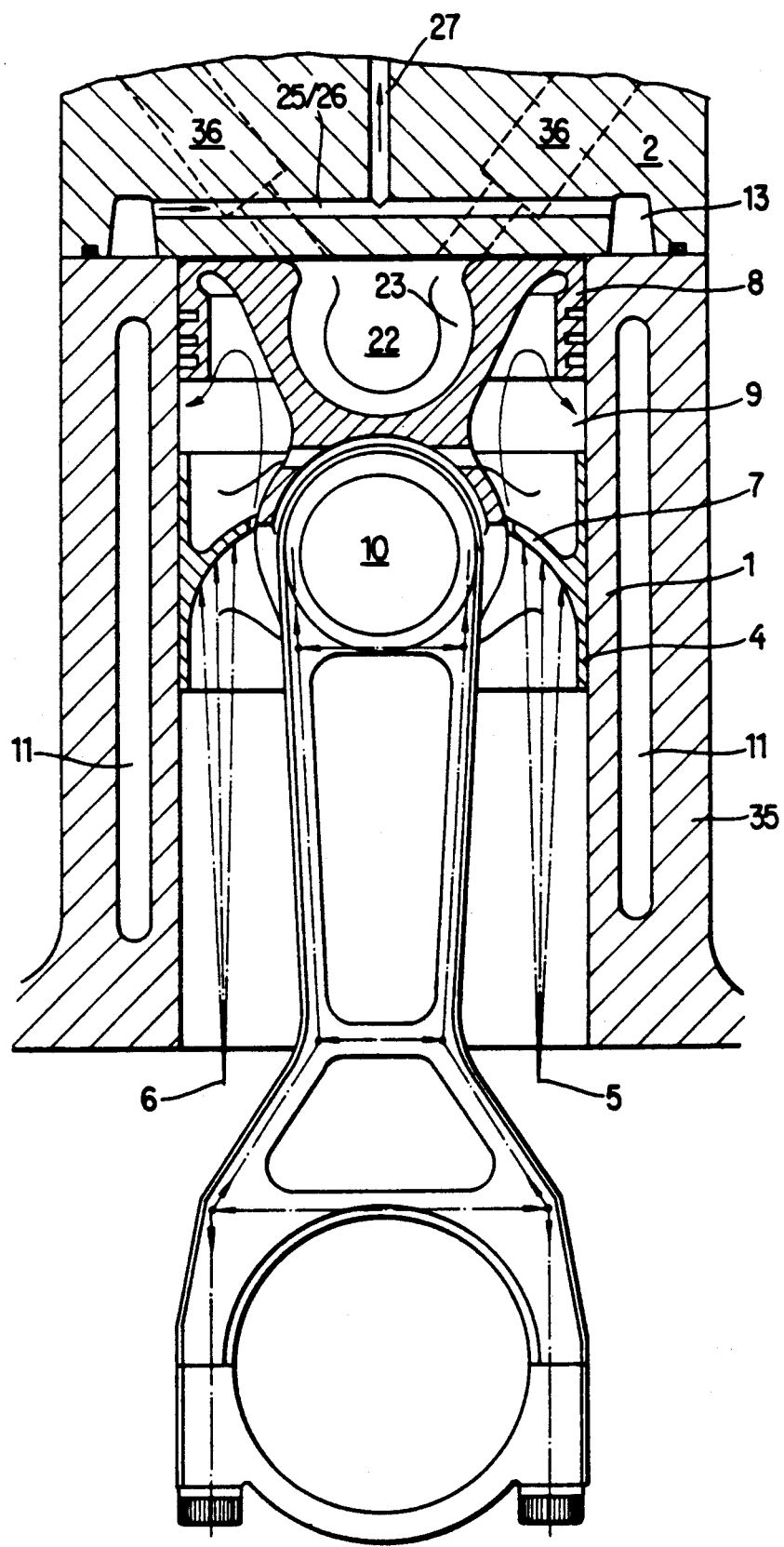

FIG. 2 shows that such a sealing flange 12 with an oil jacket 13 is not provided for suction engines and correspondingly lower average pressures. Other measures, like an increase in the number of injection nozzles 36 to delay the start of injection, result in less heating of the cylinder and the upper portion of the piston. Accordingly, an oil jacket/annular channel 13 above the plane of top dead center of the piston in the cylinder head is sufficient to insure thermal equalization of the cylinder head and the cylinder using oil cooling. In such cases, the conversion kit may have a particularly simple design because the cylinder sleeve 1 does not project into the head 2 and the head 2 does not extend into the engine block. The cooling function of the previous cooling channel 11 is eliminated in this exemplary conversion also so that, after modification, only the new cylinder head defines cooling chambers which, in accordance with the invention, are supplied with oil.

To make sure that the upper portion does not become hotter than the lower at high average pressures also, the working air is cooled by a turbocharging cooler (18 in FIG. 3) and caused to rotate at high speed via a spiral channel 19. The cooling action of this working air is increased by providing a constriction 20 in the inlet channel 19 so that the air experiences a significant pressure drop, and thereby undergoes substantial cooling, upon entering the inlet opening 21 of the cylinder.

Figure 3:
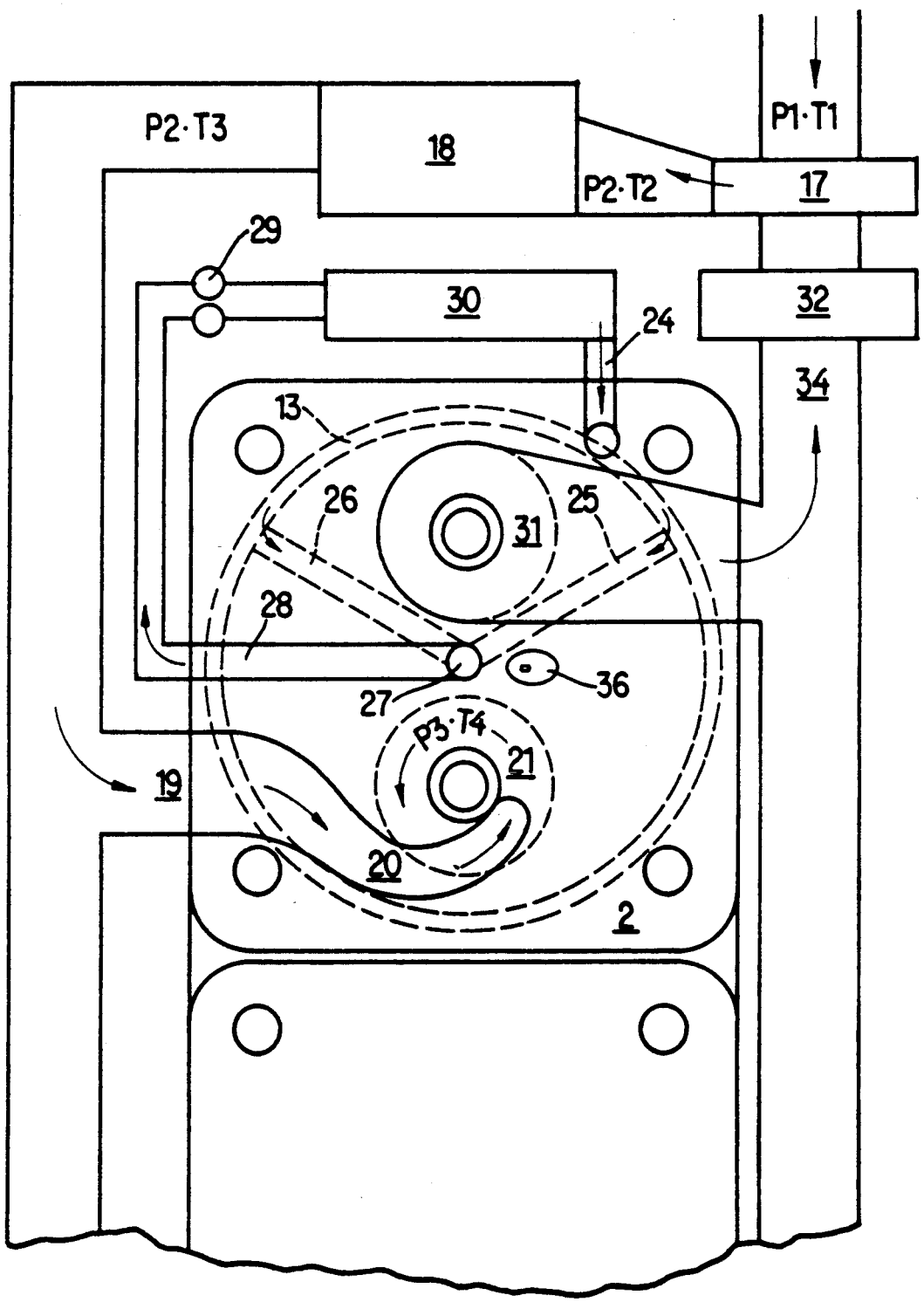
FIG. 3 illustrates air flow.

The effect described is illustrated in FIG. 3 using the indicated pressures and temperatures. The air is at the pressure P1 and the temperature T1 as it enters the compressor 17. When it leaves the compressor 17 and is in the passage to the turbocharging cooler 18, the pressure has increased to P2 and the temperature to T2. In the turbocharging cooler 18, only a reduction in temperature from T2 to T3 takes place. Finally, downstream of the constriction 20 in the inlet channel, the pressure and temperature are reduced to P3 and T4 (principle of the refrigerator).

Adjustment of the cooling of the lower portion of the cylinder by means of the internal oil cooling and adjustment of the internal cooling by means of the turbocharging air cooling are regulated in such a manner that the increase in heating with increasing average pressure in the upper portion of the cylinder corresponds to the increase in cooling action with increasing turbocharging air cooling. To assist in this adjustment of the two internal cooling actions, the upper portion 3 of the piston is made of an iron alloy and the oil cooling of the upper portion 3 of the piston is so intense that no significant heat conduction takes place from the sealing jacket 8 and the upper portion 3 of the piston to the cylinder 1. In order to also hold down heating of the upper portion of the piston, the combustion is designed such that, in accordance with the laws governing rotating accumulations of mass, the hot combustion zone 22 is insulated from the upper portion 3 of the piston by a jacket 23 of excess air.

Cooling of the cylinder head 2 is regulated in such a manner by the oil jacket 13 and the bores 24, 25, 26, 27 and 28 in FIG. 3 that thermal stresses are reduced as much as possible. In other words, the cooling oil brought into the cylinder head 2 via the oil pump 29, the oil cooler 30 and the bore 24 is mainly beneficial to the outlet channel 31 from where the exhaust gases are conducted into the exhaust gas turbine 32, which drives the compressor 17, by means of the exhaust pipes 34.

The high temperatures at the center of the cylinder head are reduced by the oil outflow bore 27 (FIGS. 1 to 3). The inlet side of the cylinder head 2 is kept cool by the incoming air which is conveyed to the engine through the channel 33.

To further prevent the occurrence of static deformation, the sealing force is introduced into the housing 35 in such a manner via the sealing flange 12 that the seating surface 37 of the cylinder 1 on the housing 35 is directly below the sealing flange 12.

We claim:

1. An internal combustion engine, particularly a four-stroke engine, comprising wall means defining a cylinder having an open end; a piston in said cylinder having an end face which confronts said open end, said piston being movable axially of said cylinder between a first position in which said end face is adjacent to said open end and a second position in which said end face is remote from said open end; a piston ring mounted on said piston and spaced from said end face, said wall means having a portion which extends between said open end and said piston ring when said piston is in said first position; a cylinder head covering said open end and having cooling channel means arranged to cool said portion of said wall means; and means for circulating cooling oil through said channel means, said channel means constituting the sole means for cooling said portion of said wall means by heat exchange with fluid flowing in a channel.

2. The engine of claim 1, wherein said wall means and said cylinder head have confronting surfaces which include first sealing sections and second sections, at least a portion of said channel means being provided in the second section of said cylinder head and being bounded in part by the second section of said wall means.

3. The engine of claim 1, wherein said channel means includes an annular channel.

4. The engine of claim 1, wherein said piston, said wall means and said cylinder head cooperate to define a combustion chamber; and further comprising means for admitting a combustible mixture and excess air into said chamber such that the excess air forms an insulating layer around said combustible mixture.

5. The engine of claim 1, wherein said cylinder is at least partly surrounded by a closed chamber.

6. The engine of claim 1, wherein air cooling means is essentially absent.

7. The engine of claim 1, wherein said cylinder head is provided with a flange which bounds at least a portion of said channel means.

8. The engine of claim 7, wherein said flange and said wall means have abutting, substantially flat sealing surfaces which close said cylinder in a gastight manner.

9. The engine of claim 1, said circulating means including a source of cooling oil; and wherein an exhaust opening is situated to one side of said cylinder head, said cylinder head having a center and being provided with flow passages for conveying cooling oil between said channel means and said source, and said flow passages being disposed at said one side of said cylinder head and at said center.

10. An internal combustion engine, particularly a four-stroke engine, comprising an upright housing, an upright cylinder having an open end and a seat which rests on said housing; a piston in said cylinder having an end face which confronts said open end, said piston being movable axially of said cylinder between a first position in which said end face is adjacent to said open end and a second position in which said end face is remote from said open end; a piston ring mounted on said piston and spaced from said end face, said cylinder having a portion which extends between said open end and said piston ring when said piston is in said first position; a cylinder head covering said open end and having cooling channel means arranged to cool said portion of said cylinder, said cylinder head being provided with a flange which bounds at least a portion of said channel means, and said flange being disposed directly above said seat; and means for circulating cooling oil through said channel means, said channel means constituting the sole means for cooling said portion of said cylinder by heat exchange with fluid flowing in a channel.

* * * * *